United States Patent
Cannon et al.

(10) Patent No.: US 10,566,296 B2
(45) Date of Patent: Feb. 18, 2020

(54) PHYSICAL UNCLONABLE FUNCTIONS IN BANK CARDS OR IDENTIFICATION CARDS FOR SECURITY

(71) Applicant: Lexmark International, Inc., Lexington, KY (US)

(72) Inventors: Roger Steven Cannon, Nicholasville, KY (US); William Corbett, Lexington, KY (US); Gary A. Denton, Lexington, KY (US); James Paul Drummond, Georgetown, KY (US); Kelly Ann Killeen, Lexington, KY (US); Carl E. Sullivan, Stamping Ground, KY (US)

(73) Assignee: Lexmark International, Inc., Lexington, KY (US)

( * ) Notice: Subject to any disclaimer, the term of this patent is extended or adjusted under 35 U.S.C. 154(b) by 99 days.

(21) Appl. No.: 15/809,081

(22) Filed: Nov. 10, 2017

(65) Prior Publication Data

US 2019/0157219 A1    May 23, 2019

Related U.S. Application Data

(63) Continuation of application No. 15/808,573, filed on Nov. 9, 2017.

(51) Int. Cl.
*H04L 9/32* (2006.01)
*H01L 23/29* (2006.01)
(Continued)

(52) U.S. Cl.
CPC .............. *H01L 23/57* (2013.01); *H01L 23/29* (2013.01); *H01L 23/3107* (2013.01);
(Continued)

(58) Field of Classification Search
CPC ..... H01L 23/57; H01L 23/573; H01L 23/576; H04L 9/3278
See application file for complete search history.

(56) References Cited

U.S. PATENT DOCUMENTS

| 3,675,367 A | 7/1972 | Amburn |
| 4,190,548 A | 2/1980 | Baermann |

(Continued)

FOREIGN PATENT DOCUMENTS

| EP | 1 475 242 A1 | 11/2004 |
| JP | 04257203 A | 9/1992 |

(Continued)

OTHER PUBLICATIONS

Non-final Office Action dated Apr. 21, 2017; U.S. Appl. No. 15/440,590.

(Continued)

*Primary Examiner* — Robert G Bachner
*Assistant Examiner* — Molly K Reida

(57) ABSTRACT

In the invention described, magnetic field characteristics of randomly placed magnetized particles are exploited by using the magnetic field fluctuations produced by the particles as measured by a sensor. The magnetized particles generate a complex magnetic field near the surface of an integrated circuit chip on a bank card or identification card that can be used as a "fingerprint." The positioning and orientation of the magnetized particles is an uncontrolled process, and thus the interaction between the sensor and the particles is complex. The randomness of the magnetic field magnitude and direction near the surface of the material containing the magnetic particles can be used to obtain a unique identifier for an item such as an integrated circuit chip on a bank card or identification card carrying the PUF.

16 Claims, 8 Drawing Sheets

(51) Int. Cl.
*H01L 23/31* (2006.01)
*H01L 23/58* (2006.01)
*H01L 23/00* (2006.01)
*H01L 23/495* (2006.01)

(52) U.S. Cl.
CPC ...... *H04L 9/3278* (2013.01); *H01L 23/49541* (2013.01); *H01L 24/06* (2013.01); *H01L 24/46* (2013.01); *H01L 2224/04042* (2013.01)

(56) References Cited

U.S. PATENT DOCUMENTS

| | | |
|---|---|---|
| 4,218,674 A | 8/1980 | Brosow |
| 4,462,919 A | 7/1984 | Saito |
| 4,734,695 A | 5/1988 | Goldman |
| 5,424,917 A * | 6/1995 | Hiruta ................ H01L 23/427 174/15.2 |
| 5,451,759 A | 9/1995 | Hoshino |
| 5,602,381 A | 2/1997 | Hoshino |
| 5,792,380 A | 8/1998 | Wen |
| 5,857,129 A | 1/1999 | Harris |
| 5,958,283 A | 9/1999 | Schmid |
| 5,981,053 A | 11/1999 | Naylor |
| 6,063,647 A | 5/2000 | Chen |
| 6,432,559 B1 | 8/2002 | Tompkins |
| 6,812,707 B2 | 11/2004 | Yonezawa |
| 7,005,733 B2 | 2/2006 | Kommerling |
| 7,218,589 B2 | 5/2007 | Wisnudel |
| 7,353,994 B2 | 4/2008 | Farrall |
| 7,427,020 B2 | 9/2008 | Haraszti |
| 7,704,438 B2 | 4/2010 | Barlog |
| 7,865,722 B2 | 1/2011 | Moran |
| 8,421,625 B2 | 4/2013 | Cowburn |
| 8,497,983 B2 | 7/2013 | Cowburn |
| 8,502,668 B2 | 8/2013 | Cowburn |
| 8,742,891 B2 | 6/2014 | Greene |
| 8,761,639 B1 | 6/2014 | Leemhuis |
| 9,292,717 B2 | 3/2016 | Moran |
| 9,454,125 B1 | 9/2016 | Bejat et al. |
| 9,502,356 B1 | 11/2016 | Parvarandeh |
| 9,524,456 B1 | 12/2016 | Ahne |
| 9,542,576 B1 | 1/2017 | Ahne |
| 9,553,582 B1 | 1/2017 | Booth |
| 9,665,748 B1 | 5/2017 | Ahne |
| 2001/0033012 A1 | 10/2001 | Kommerling |
| 2002/0021909 A1 | 2/2002 | Harumoto |
| 2003/0040129 A1 | 2/2003 | Shah |
| 2003/0059050 A1 | 3/2003 | Hohberger |
| 2004/0114944 A1 | 6/2004 | Urabe |
| 2005/0017082 A1 | 1/2005 | Moran |
| 2005/0111342 A1 | 5/2005 | Wisnudel |
| 2005/0116307 A1 | 6/2005 | De Jongh |
| 2005/0258962 A1 | 11/2005 | Phipps |
| 2006/0056021 A1 | 3/2006 | Yeo |
| 2007/0199991 A1 | 8/2007 | Haraszti |
| 2007/0222604 A1 | 9/2007 | Phipps |
| 2008/0052518 A1 | 2/2008 | Newton |
| 2008/0199667 A1 | 8/2008 | Cho |
| 2008/0210757 A1 | 9/2008 | Burden |
| 2008/0231418 A1 | 9/2008 | Ophey |
| 2008/0256600 A1 | 10/2008 | Schrijen |
| 2009/0061226 A1 | 3/2009 | Banin |
| 2009/0141410 A1 | 6/2009 | Jogo |
| 2009/0218401 A1 | 9/2009 | Moran |
| 2010/0038598 A1 | 2/2010 | Bastiaansen |
| 2010/0061772 A1 | 3/2010 | Hayashi |
| 2010/0196056 A1 | 8/2010 | Ohkawa et al. |
| 2010/0215406 A1 | 8/2010 | Ozawa |
| 2010/0219251 A1 | 9/2010 | Decoux |
| 2011/0038649 A1 | 2/2011 | Miyabe |
| 2011/0099117 A1 | 4/2011 | Schepers |
| 2011/0121498 A1 | 5/2011 | Irie |
| 2011/0229211 A1 | 9/2011 | Ohashi |
| 2011/0234346 A1 | 9/2011 | Honkura |
| 2012/0020678 A1 | 1/2012 | Wilsher |
| 2012/0076543 A1 | 3/2012 | Rapkin |
| 2012/0104097 A1 | 5/2012 | Moran et al. |
| 2012/0163872 A1 | 6/2012 | Hayashi et al. |
| 2013/0029112 A1 | 1/2013 | Bargin |
| 2013/0277425 A1 | 10/2013 | Sharma |
| 2013/0287267 A1 | 10/2013 | Varone |
| 2013/0320087 A1 | 12/2013 | Moran |
| 2014/0270857 A1 | 9/2014 | Harpur |
| 2014/0283146 A1 | 9/2014 | Obukhov |
| 2015/0071432 A1 | 3/2015 | Zhu |
| 2016/0105220 A1 | 4/2016 | Kim et al. |
| 2016/0245878 A1 | 8/2016 | Hwang et al. |
| 2017/0103791 A1 | 4/2017 | Booth |
| 2017/0104600 A1 | 4/2017 | Booth |

FOREIGN PATENT DOCUMENTS

| | | |
|---|---|---|
| WO | 2005/112009 A2 | 11/2005 |
| WO | 2012/020263 A1 | 2/2012 |
| WO | WO201319536 A1 * | 9/2013 |
| WO | WO2013139536 A1 | 9/2013 |

OTHER PUBLICATIONS

Amendment entered Jul. 19, 2017; U.S. Appl. No. 15/440,590.
Final Office Action dated Sep. 11, 2017; U.S. Appl. No. 15/440,590.
International Search Report dated Jan. 6, 2017 PCT/US16/63832.
International Written Opinion dated Jan. 6, 2017 PCT/US16/63832.
International Search Report dated Jan. 23, 2017; PCT/US16/61063.
International Written Report dated Jan. 23, 2017; PCT/US16/61063.
Non-final office action dated Jun. 22 2016; U.S. Appl. No. 14/879,335.
Non-final office action dated Jun. 17, 2016; U.S. Appl. No. 14/879,344.
Roel Maes, Ingrid Verbauwhede, "Physically unclonable functions: A study on the state of the art and future research directions", article, 2010.
Pappu Srinivasa Ravikanth, "Physical One-Way Functions", thesis, Mar. 2001, MIT.
"About Bonded Neo Powders", Magnequench Technical Resource Website, https://mqitechnology.com/support-contact/history/, Revised 2017, Accessed Jun. 22, 2019 (Year: 2017).
Material Safety Data Sheet for MQP-B by Magnequench. Revised Jun. 2, 2017. (Year: 2017).

* cited by examiner

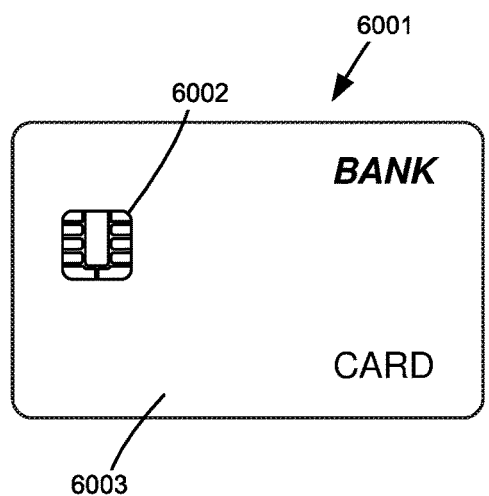
Figure 6
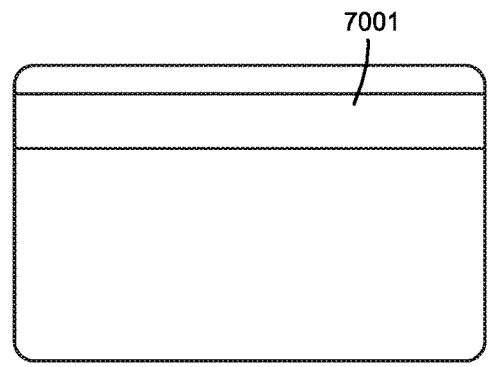
Figure 7
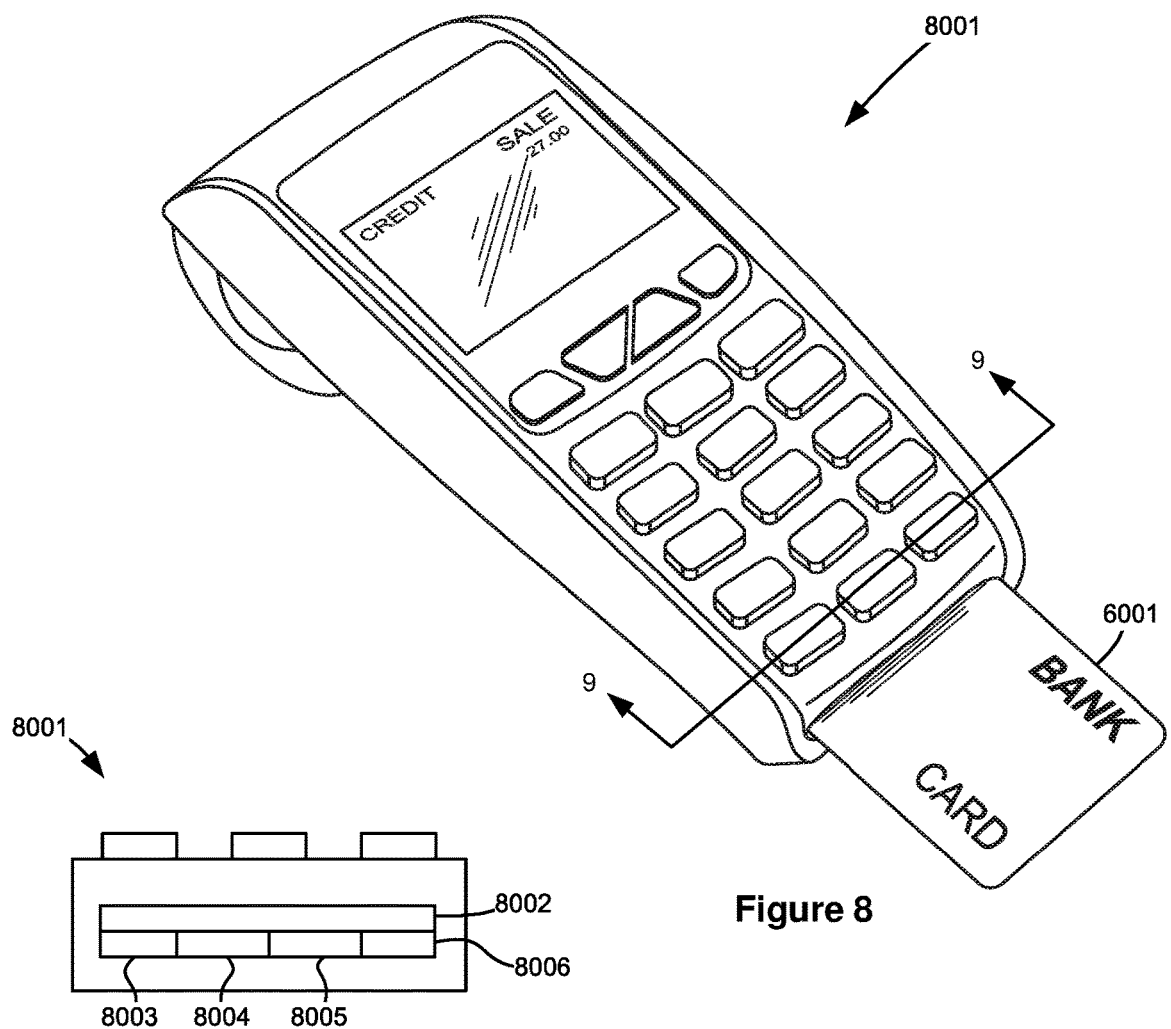
Figure 8
Figure 9

PHYSICAL UNCLONABLE FUNCTIONS IN BANK CARDS OR IDENTIFICATION CARDS FOR SECURITY

CROSS REFERENCES TO RELATED APPLICATIONS

This application claims priority and benefit as a continuation application of U.S. patent application Ser. No. 15/808,573, entitled "Physical Unclonable Functions in Integrated Circuit Chip Packaging for Security," filed on Nov. 9, 2017.

BACKGROUND

1. Field of the Disclosure

The present disclosure relates generally to anti-counterfeit systems and more particularly to physical unclonable functions.

2. Description of the Related Art

Counterfeit integrated circuit chips ("ICCs") are a major concern in the electronic component supply industry because of reliability and security issues. Such counterfeit ICCs are impacting many industrial sectors, including computers, printing, telecommunications, automotive electronics, medical, banking, energy/smart-grid, aerospace, and military systems. The consequences can be dramatic when critical systems begin to fail or act maliciously due to the use of counterfeit or low-quality components causing minor, major, or mission failures, including health or safety concerns.

The National Defense Authorization Act (NDAA) of 2012, for example, is focused on defense contractors who do not screen their equipment for counterfeit parts. There can be civil and criminal liability for contractors who do not eliminate counterfeit electronic parts in military equipment, according to the Forbes article, "*NDAA May Put Defense Contractors In Prison For Counterfeit Parts*," Feb. 14, 2012.

The tools and technologies utilized by counterfeiters have become extremely sophisticated and well financed. In turn, this also calls for more sophisticated methods to detect counterfeit electronic parts that enter the market. Hardware intrinsic security is a mechanism that can provide security based on inherent properties of an electronic device. A physical unclonable function ("PUF") belongs to the realm of hardware intrinsic security.

In the printer industry, counterfeit printer supplies including ICCs are a problem for consumers. Counterfeit supplies may perform poorly and may damage printers. Printer manufacturers use authentication systems to deter counterfeiters. PUFs are a type of authentication system that implements a physical one-way function. Ideally, a PUF cannot be identically replicated and thus is difficult to counterfeit. Incorporating a PUF in electronic device packaging, including ICCs, deters counterfeiters.

SUMMARY

In the invention described, magnetic field characteristics of randomly placed magnetized particles are exploited by using the magnetic field fluctuations produced by the particles as measured by a sensor, such as a Hall-effect sensor, or an array of such sensors. The invention consists of an ICC encased in or over-molded by a substrate that contains magnetic particles. The magnetized particles generate a complex magnetic field near the surface of the ICC that can be used as a "fingerprint." The positioning and orientation of the magnetized particles is an uncontrolled process, and thus the interaction between the sensor and the particles is complex. Thus, it is difficult to duplicate the device such that the same magnetic pattern and particle physical location pattern will arise. The randomness of the magnetic field magnitude and direction near the surface of the material containing the magnetic particles can be used to obtain a unique identifier for an item such as an integrated circuit chip carrying the PUF. Further, the placement of the device in the top layer of an integrated circuit chip protects the underlying circuits from being inspected by an attacker, e.g., for reverse engineering. When a counterfeiter attempts to remove all or a portion of the coating, the magnetic field distribution must change, thus destroying the original unique identifier.

The invention, in one form thereof, is directed to an integrated circuit chip overlain or encapsulated by a PUF comprising randomly placed magnetic particles.

The invention, in another form thereof, is directed to an integrated circuit chip used in a printer or printer supply component, such as a toner cartridge, that is overlain or encapsulated by a PUF comprising randomly placed magnetic particles.

The invention, in yet another form thereof, is directed to an EMV (Europay, Mastercard, Visa) transaction chip or embedded microchip on a bank card overlain by a PUF comprising randomly placed magnetic particles.

The invention, in yet another form thereof, is directed to an apparatus having an EMV transaction chip mounted on substrate that forms the body of a bank card, where a plurality of magnetized particles are dispersed in the substrate to form a PUF.

BRIEF DESCRIPTION OF THE DRAWINGS

The accompanying drawings incorporated in and forming a part of the specification, illustrate several aspects of the present disclosure, and together with the description serve to explain the principles of the present disclosure.

FIG. 6 is a view of the front of a bank card with an EMV transaction chip.

FIG. 7 is a view of the back of a bank card with a magnetic strip.

FIG. 8 is a bank card chip reader device.

FIG. 9 is an end view of the bank card chip reader device.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

Figure 1:
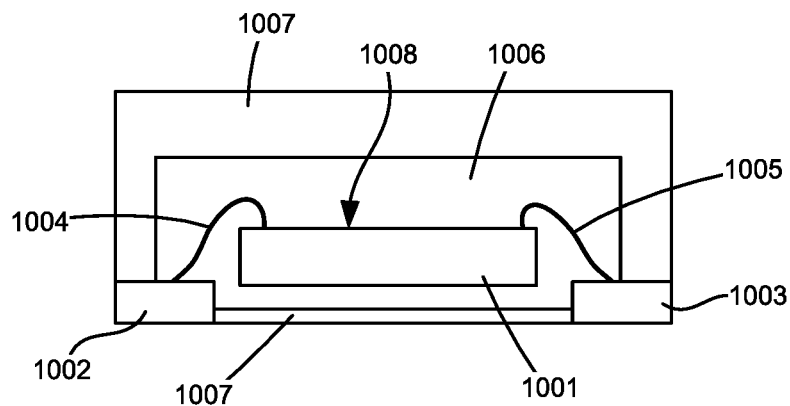
FIG. 1 is a view of an integrated chip.

Referring now to the drawings and particularly to FIG. 1, when an ICC 1001 is manufactured, it is typically packaged by being attached to a metal lead frame 1008 that is connected to solder pads 1002 and 1003 by a wire bonds 1004 and 1005, and then enclosed in an encapsulant 1006 which is then cured. The encapsulated chip is then molded into a plastic housing 1007.

Figure 2:
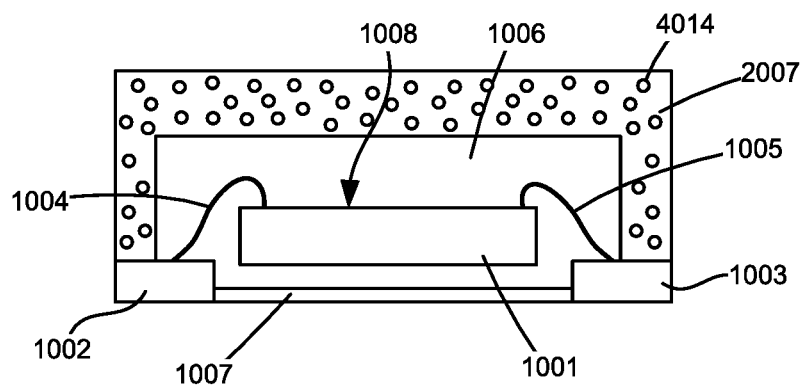
FIG. 2 is a view of an integrated chip with magnetized particles molded into the housing.

Referring now to FIG. 2, in one embodiment of the invention, the molded plastic housing 1007 is replaced with the molded plastic housing or substrate 2007 where dispersed in the substrate is a plurality of magnetized particles 4014. The particles are distributed randomly such that it is extremely difficult to reproduce the exact distribution and alignment of particles. Preferably, the particles are magnetized before dispersion in the substrate to add further randomness to the resulting magnetic field profile. Thus, the substrate 2007 and the particles 4014 form a physical unclonable function out of the molded plastic housing.

The magnetic field profile near the surface of the ICC may be measured by an external magneto-resistive sensor, a Hall-effect sensor (not shown), or an array of such sensors, in close proximity to the top surface of the ICC. Since the sensing elements are typically around 0.3-0.5 mm below the surface of the sensing device, the average particle size diameter using Hall-effect sensor or magneto-resistive sensor is preferably greater than 0.1 mm. Note that the diameter of a non-spherical particle is the diameter of the smallest sphere that encloses the particle. Other sensor options include magneto-optical sensor technology, which is capable of working with smaller magnetic particle sizes, but is more costly to implement and subject to contamination problems.

Figure 11:
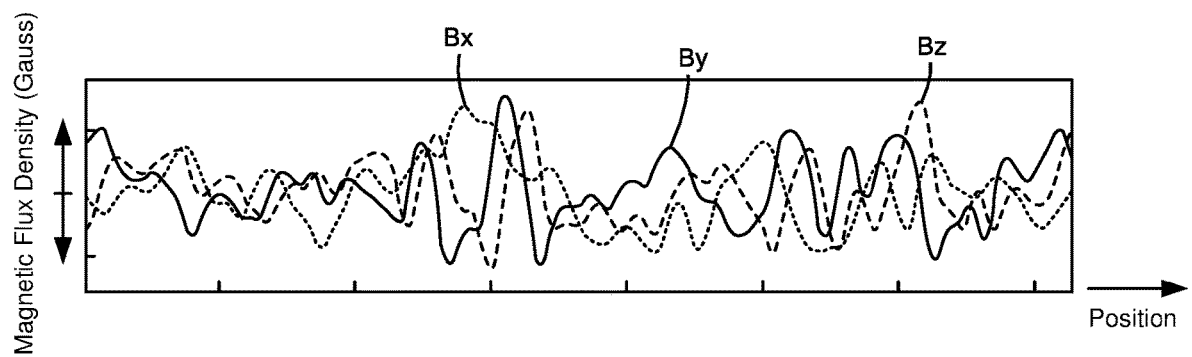
FIG. 11 is a magnetic field profile along a defined path.
Figure 12A:
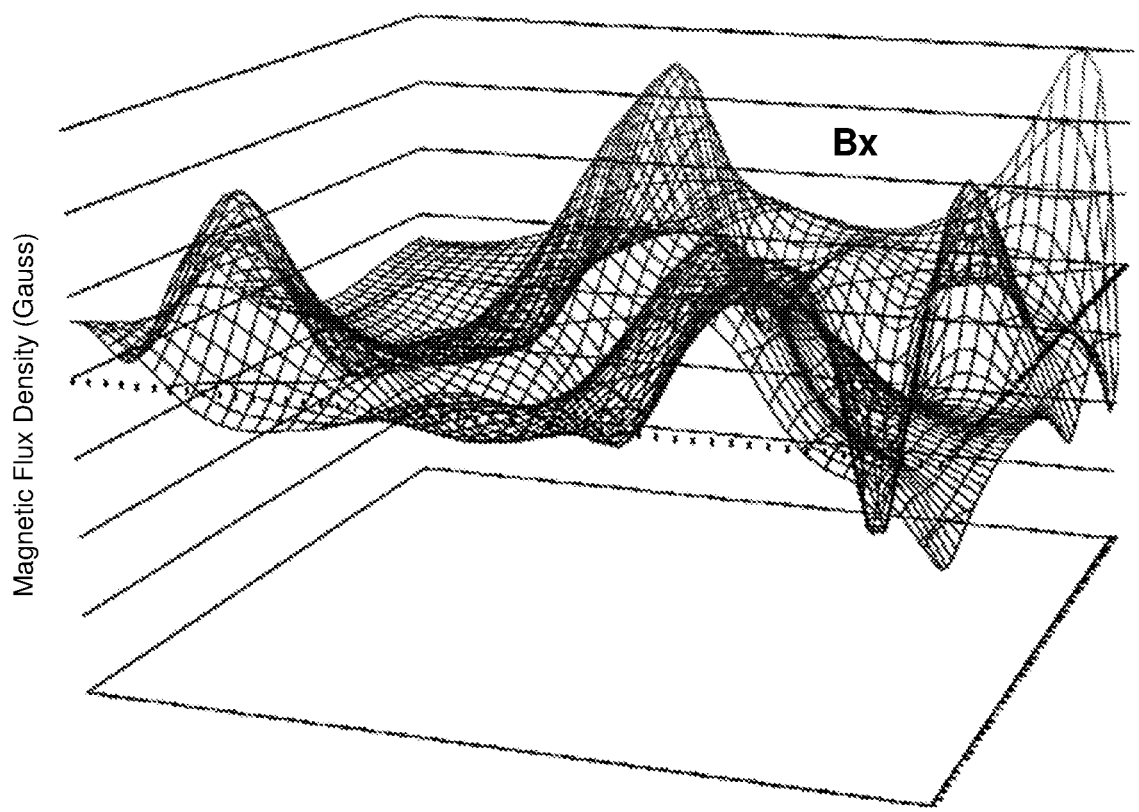
FIGS. 12*a*, 12*b*, and 12*c* are three-dimensional representations of the magnetic flux density measured across the area resolved into three coordinate components, $B_x$, $B_y$, and $B_z$.
Figure 12B:
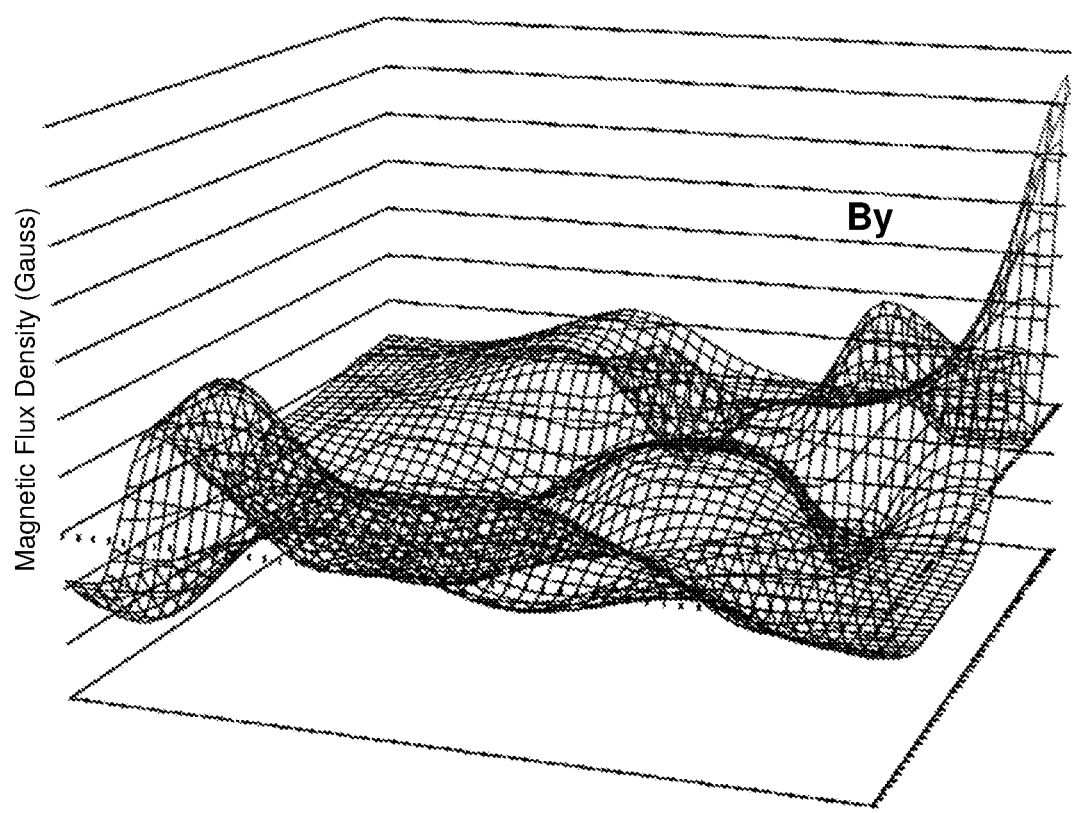
Figure 12C:
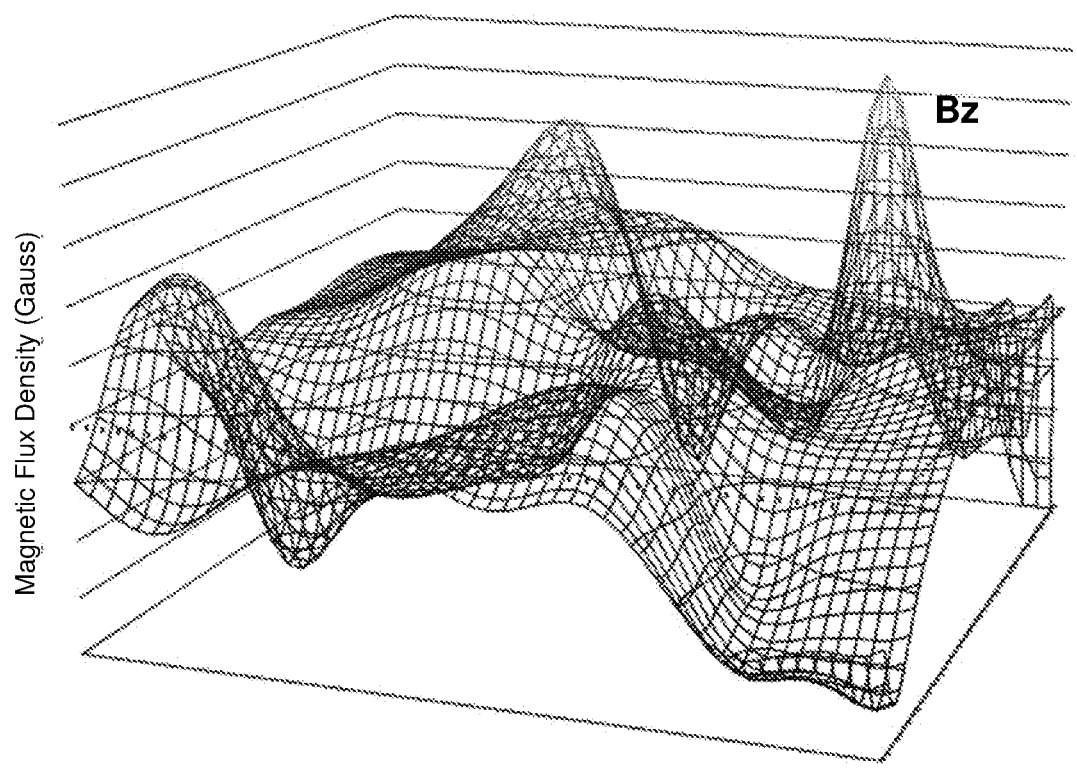

The magnetic field profile measurements may be taken within a defined area or along a defined path: straight, circular, or any arbitrarily selected and defined path, and recorded at the ICC foundry. FIG. 11 shows a magnetic field profile along a defined path where the magnetic flux density has been resolved into three coordinate components $B_x$, $B_y$, and $B_z$. FIG. 12 shows a magnetic field profile measured over a rectangular area as would be exhibited by the defined area overlaying an ICC. The profile is a three-dimensional representation of the magnetic flux density measured across the area. The magnetic flux density vector has been resolved into three coordinate components, $B_x$, $B_y$, and $B_z$, shown separately in FIGS. 12a, 12b, and 12c. The magnetic field profile data would be signed by a private key and written to the ICC's non-volatile memory ("NVM") during programming. After installation of the ICC onto a circuit card, the magnetic "fingerprint" is once again read by an external magneto-resistive sensor and the magnetic profile is compared to the values stored on the chip to authenticate the ICC. This system would make it very difficult for counterfeit ICCs to make their way into high value applications. The system would be fairly inexpensive to implement with almost instantaneous authentication of the PUF over-molded ICCs.

Figure 3:
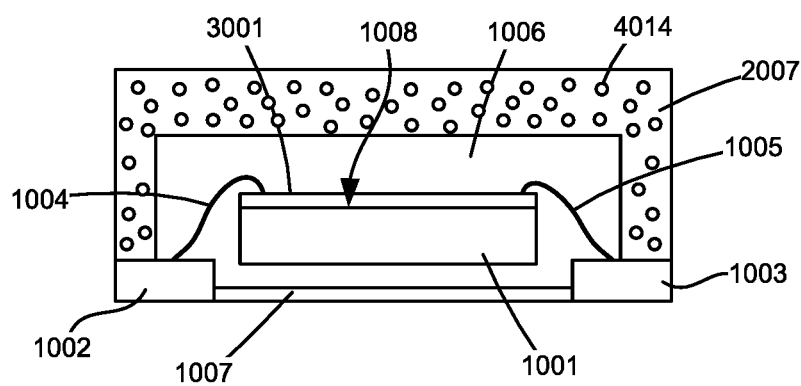
FIG. 3 is a view of an integrated chip with an array of sensors formed above the chip with magnetized particles molded into the housing.

Referring now to FIG. 3, in a second embodiment of the invention, the use of magnetized particles 4014 creates a unique magnetic fingerprint that can be applied to the manufacture of ICCs by over-molding the encapsulated chip 1001 with a substrate containing magnetized particles 2007. The term "over-molded" is used here broadly to mean anything from adding a partial surface layer over the ICC to completely encasing the ICC. One or more sensors, such as a Hall-effect sensor 3001 is formed above the chip body and encased within the housing 2007. In this embodiment, the sensor(s) 3001 can record a series of analog magnetic intensity readings, in various locations along the substrate, in one, two, or three coordinate directions. Such an "internal" Hall-effect sensor can measure average particle size diameters that are less than 0.1 mm. Since these measurements are analog voltages, with a sufficient number of measurements and sufficient analog to digital resolution, unique values can be derived from the measurements. These values can be used for private keys, seeds, etc. which are not stored in the device's memory. Instead, they are read and derived by the device "in flight" (i.e., during operation), thus rendering ineffective any probing attacks by counterfeiters on the chip itself. If a counterfeiter were to attempt to extract the private key from the ICC, it is highly probable that the over-molded magnetic layer will be disturbed and the private key would be lost.

These embodiments may, for example, be implemented on an integrated circuit chip on a printer or printer supply component, such as a toner cartridge, that is used to authenticate the toner cartridge for whatever purpose, as well as to perform other functions such as toner level monitoring, sheet count, etc A third embodiment of the invention is the application of the PUF authentication technology to bank cards and identification cards with an EMV transaction chip. Bank cards 6001, for example, are under constant attack by counterfeiters. For this reason an EMV transaction chip 6002 mounted on a substrate 6003 that replaced the easily counterfeited magnetic strip 7001 shown in FIG. 7, the back of the bank card 6001. To avoid fraud, the EMV transaction chip may be used with a personal identification number ("PIN"), but many cards lack this extra protection for convenience of the customer, to reduce data requirements in transactions, and to avoid software upgrades for the PIN operation.

Bank cards with EMV transaction chips are mostly used in a contact-based form: the card is inserted into a reader, which creates a circuit that allows handshaking between the card and the payment terminal. A unique transaction is created that involves cryptographic data embedded in the chip.

For cards that require PINs, the transaction can't be completed without the code, which is not transmitted remotely as with debit and ATM transactions. Some cards are equipped with near-field communications (NFC) radios for contactless EMV transaction, and will work with point-of-sale systems.

A unique magnetic PUF signature of the analog magnetic intensity readings could replace the PIN requirement to authenticate the bank card. The PUF signature would be a second factor authentication for the bank card.

The substrate of a bank card may be fabricated where dispersed in the substrate is a plurality of magnetic particles. The particles are distributed randomly such that it is extremely difficult to reproduce the exact distribution and alignment of particles. Thus, the substrate and the particles of the bank card form a physical unclonable function. The magnetic field profile may be measured by an external sensor, such as a Hall-effect sensor (not shown) in close proximity to the bank card surface. Other sensor options include magneto-optical sensor technology. The magnetic field profile measurements may be taken within a defined area or along a defined path: straight, circular, or any arbitrarily selected and defined path, and recorded during manufacture of the bank card. The magnetic field profile data would be written to the EVM transaction chip's non-volatile memory.

When inserted into a card reader 8001, the reader could sweep a sensor arm across a portion of the bank card and one or more sensors, such as Hall-effect sensors, located on the sensor arm would measure the magnetic field in a defined area or along the defined path. A simple mechanical configuration with a drive cam would determine the path of the sensor arm sweep. Alternatively, as shown in FIG. 9, the sensor or sensor array could be at a fixed location where the bank card slides across the sensors 8003, 8004, 8005, and 8006 as the bank card is inserted into the reader slot 8002. Data corresponding to the magnetic intensity readings along the sensing path stored in the EMV transaction chip's non-volatile memory and used to validate the magnetic "fingerprint" detected by the card reader at time of the transaction. This invention does not require the user to remember a PIN, and the card reader can perform the validation locally. Alternatively, the card reader could be configured to transmit the magnetic "fingerprint" to the bank card company server or cloud location for remote authentication when high value transactions are taking place. Data that is stored in a cloud location is stored in an accessible network such as the Internet on physical storage devices such as computer servers and storage networks.

As an added layer of security, the EMV transaction chip on the card could contain information that would guide the card reader to read the magnetic "fingerprint" in a specific location on the bank card. This location could be different for different cards and would add yet another layer of complexity to the task of counterfeiting a bank card. A varying position of the magnetic "fingerprint" could also be configured to act as a rotating encryption key. This rotating key could change on a daily, weekly, or monthly basis. The rotating key could be as simple as two keys in which data is read off the "fingerprint" in a forward or reverse motion, which would be the least disruptive to current card reader configurations. Known algorithms could be utilized to determine when the "fingerprint" rotates.

In another embodiment, the bank card substrate to which the EMV transaction chip is mounted could be the location of a magnetic "fingerprint" such that removal or alteration of the EMV transaction chip would distort the substrate and thus alter the magnetic "fingerprint," rendering the authentication inoperable. In a further embodiment, the bank card could be implemented in such a way as to cause tearing to the fingerprint if the chip is removed.

The card reader may initiate the bank card authentication by sending a request to the EMV transaction chip on the bank card for data. The bank card EMV transaction chip may challenge the card reader and wait for a proper response (authenticating the reader) before the bank card security chip transmits the magnetic "fingerprint" authentication data to the reader. This challenge and response protocol makes it more difficult for counterfeiters to acquire data from the bank card. In addition to using the magnetic "fingerprint" or signature of the bank card, capacitive sensing technology may be used to detect the presence of the randomly distributed magnetized particles in the bank card, which could provide yet another authentication step for validating the bank card.

If at least one face of the bank card is non-opaque, the presence of the magnetized particles could be detected optically by a digital camera chip or by an optical sensor. Similar to capacitive sensing, this could provide an additional authentication step for the bank card.

This technology could also be used in the same manner described above to authenticate access badges for secure facilities, or for other applications such as passports, government identification cards, driver licenses, etc. The PUF technology could stand alone as a security device, or in combination with a integrated circuit chip on the identification card or other security device having non-volatile memory.

Figure 4:
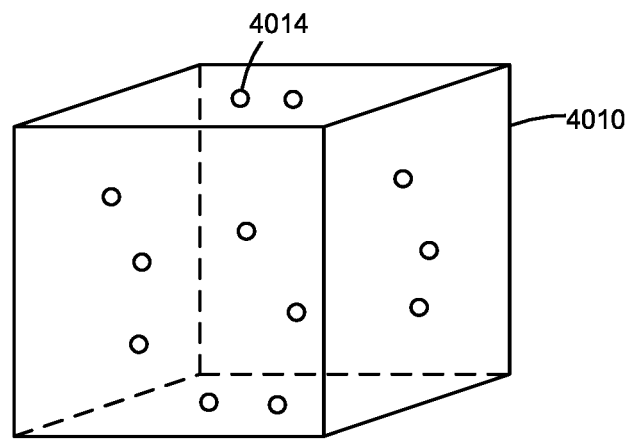
FIG. 4 is an orthogonal view of a substrate containing magnetic and non-magnetic particles.

FIG. 4 shows a region of a substrate 4010. Dispersed in the substrate is a plurality of magnetized particles 4014. The particles are distributed randomly such that it is extremely difficult to reproduce the exact distribution and alignment of particles. Thus, the substrate 4010 and the particles 4014 form a PUF.

Figure 5:
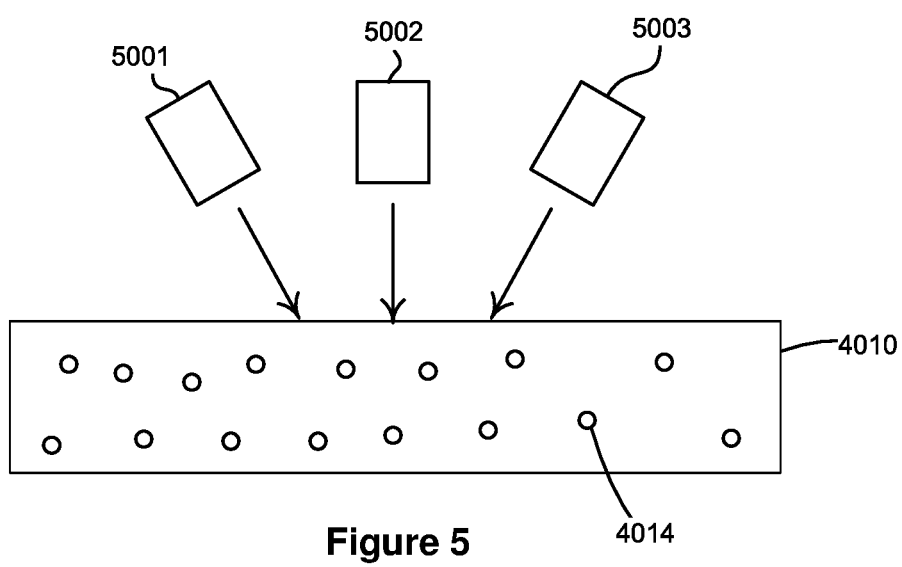
FIG. 5 is a side view of a PUF and PUF readers.

FIG. 5 shows a side view of the substrate 4010 containing the magnetized particles 4014.

The field data may be measured while moving the PUF relative to a stationary magnetic field sensor(s) 5001, 5002, 5003 or by moving the magnetic field sensor(s) 5001, 5002, 5003 next to a stationary PUF, etc. The sensors are shown in varying orientations, but such a varied orientation is not necessary. Multiple sensors may be used to reduce the movement and time required to measure the magnetic field over a desired area.

Figure 10:
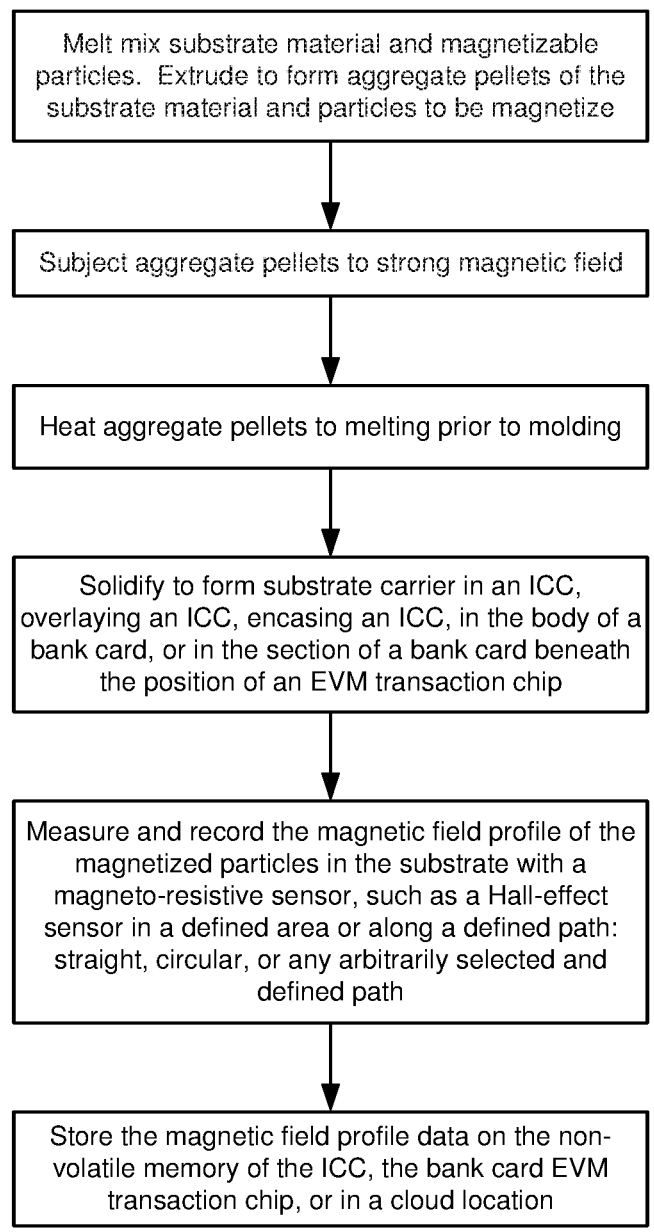
FIG. 10 is a flowchart of a method of making a secure device.

FIG. 10 shows an example of a method of making a secure device, such as an integrated circuit chip with a PUF overlay or a bank card with an EMV transaction chip with a PUF substrate.

The magnetizable particles may be of any shape, and may contain neodymium and iron and boron. Alternatively, the magnetizable particles may contain samarium and cobalt. Preferably, the magnetized particles generate a sufficiently strong magnetic field to be detected with a low-cost detector.

Suitable substrate materials are used that allow formed aggregate pellets of the substrate material and particles to be magnetized. The magnetizable particles are magnetized by, for example, subjecting the pellets to a strong magnetic field. After magnetization, the magnetic particles do not clump together because the pellet carrier material is a solid. During the molding process, the pellets are heated and melted prior to molding.

The substrate carrier is then solidified in an ICC, overlaying an ICC, encasing an ICC, in the body of a bank card, or in the section of a bank card beneath the section of a bank card beneath the position of an EVM transaction chip. In an alternate embodiment the carrier may be, for example, a liquid that is caused to become solid by adding a chemical, subjecting to ultraviolet light, increasing its temperature, etc. Causing the carrier to become solid locks the distribution and orientation of the particles. In this case a high viscosity liquid is preferred so that the particles may be magnetized shortly before the material is molded. The high viscosity retards the movement of the magnetic particles toward each other while the material is in a liquid state and minimizes clumping of the magnetized particles. Clumping could cause failures of the over-molding process.

Magnetizing the particles in pellet form yields a more random magnetic field pattern, and is therefore more difficult to clone. Further, the application of a magnetizing field with patterned or randomized orientation may be applied to a formed substrate with random particle positions in order to cause greater diversity of magnetic field orientation.

The foregoing description illustrates various aspects and examples of the present disclosure. It is not intended to be exhaustive. Rather, it is chosen to illustrate the principles of the present disclosure and its practical application to enable one of ordinary skill in the art to utilize the present disclosure, including its various modifications that naturally follow. All modifications and variations are contemplated within the scope of the present disclosure as determined by the appended claims. Relatively apparent modifications include combining one or more features of various embodiments with features of other embodiments.

What is claimed is:

1. An apparatus comprising:
   a substrate forming the body of a bank card;
   an EMV transaction chip on the bank card;
   a plurality of magnetized particles randomly dispersed in the substrate; and
   a non-volatile memory on the EMV transaction chip, wherein the non-volatile memory contains magnetic field profile data measured from the magnetized particles.

2. The apparatus of claim 1, wherein the magnetized particles contain neodymium and iron and boron.

3. The apparatus of claim 1, wherein the magnetized particles contain samarium and cobalt.

4. The apparatus of claim 1, wherein the average particle size diameter of the magnetized particles is greater than 0.1 mm.

5. The apparatus of claim 1, wherein the average particle size diameter of the magnetized particles is less than 0.1 mm.

6. The apparatus of claim 1, wherein the substrate containing the magnetized particles is in direct contact with the EMV transaction chip.

7. A system comprising:
   a substrate forming the body of a bank card;
   an EMV transaction chip on the bank card;
   a plurality of magnetized particles randomly dispersed in the substrate;
   a non-volatile memory on the EMV transaction chip that contains the magnetic field profile data measured from the magnetized particles;
   a card reader; and
   one or more sensors in the card reader, wherein when the bank card is inserted into the card reader the sensors measure the magnetic field in a defined area or along the defined path of the bank card.

8. The apparatus of claim 7, wherein the magnetized particles contain neodymium and iron and boron.

9. The apparatus of claim 7, wherein the magnetized particles contain samarium and cobalt.

10. The apparatus of claim 7, wherein the average particle size diameter of the magnetized particles is greater than 0.1 mm.

11. The apparatus of claim 7, wherein the average particle size diameter of the magnetized particles is less than 0.1 mm.

12. A system comprising:
    a substrate forming the body of a bank card;
    an EMV transaction chip on the bank card;
    a plurality of magnetized particles randomly dispersed in the substrate;
    a cloud location that contains the magnetic field profile data measured from the magnetized particles;
    a card reader; and
    one or more sensors in the card reader, wherein when the bank card is inserted into the card reader the sensors measure the magnetic field in a defined area or along the defined path of the bank card.

13. The apparatus of claim 12, wherein the magnetized particles contain neodymium and iron and boron.

14. The apparatus of claim 12, wherein the magnetized particles contain samarium and cobalt.

15. The apparatus of claim 12, wherein the average particle size diameter of the magnetized particles is greater than 0.1 mm.

16. The apparatus of claim 12, wherein the average particle size diameter of the magnetized particles is less than 0.1 mm.

* * * * *